PNEUMATICALLY OPERATED PUNCHED TAPE READING DEVICE
Filed July 14, 1967
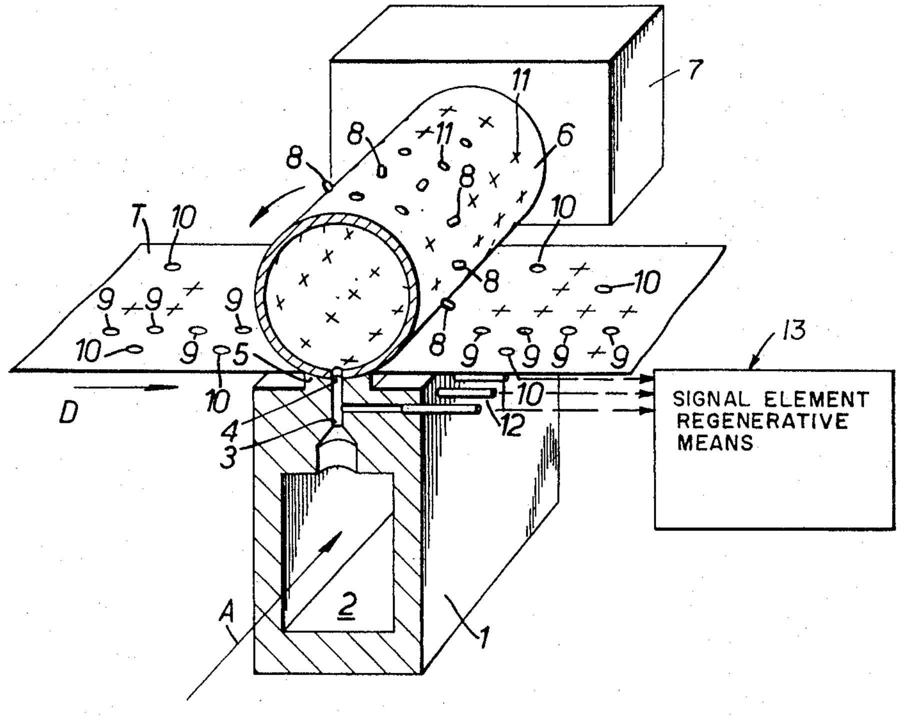
INVENTOR
John Sydney Cant
BY
Baldwin Wight Diller & Brown
ATTORNEYS United States Patent Office 3,530,282
Patented Sept. 22, 1970

3,530,282
PNEUMATICALLY OPERATED PUNCHED TAPE READING DEVICE

John Sydney Cant, Chelmsford, England, assignor to The Marconi Company Limited, London, England, a British company Filed July 14, 1967, Ser. No. 653,552
Claims priority, application Great Britain, July 19, 1966, 32,309/66
Int. Cl. G06k 9/02
U.S. Cl. 235—61.11 2 Claims

ABSTRACT OF THE DISCLOSURE

Pneumatic punched tape readers commonly use input and output channels separated by a perforated tape. In operation gas is forced from the input channels through the holes in the tape to the receiving channels where it actuates signal means. The invention uses input channels leading gas under pressure to a row of mouths in a fixed surface. In operation tape is drawn across and pressed against the surface by a roller having holes arranged to exhaust, to atmosphere, gas which has passed through any of the mouths and the holes in the tape, whereby changes in pressure in the input channels, which are closed by the tape when a hole is not present, actuate signal means.

This invention relates to pneumatically operated punched tape reading devices. For the sake of brevity such devices will be hereinafter termed "pneumatic punched tape readers."

In pneumatic punched tape readers as at present in common use, a paper or other tape, which has been previously punched with holes representative of signals in a particular signal code, is drawn lengthwise over a pre-determined number (the number depends on the code used) of channel mouths which are arranged in a row extending across the width of the tape. Gas—almost invariably air, but theoretically any gas could be used—is supplied under pressure to the channels. Opposite this row of mouths and on the other side of the tape is a second row of the same number of mouths which are the entrance mouths of a number of channels leading individually to pressure actuated signal element regenerating means. The punched tape passes with minimum clearance between the two rows of mouths so that whether or not air can pass between a mouth in one row to a corresponding mouth in the other is determined by whether the material of the tape is for the moment, blocking the path between the two mouths or whether a punched hole in the tape is opening that path. Accordingly signals represented by different combinations of holes punched in the tape in accordance with a telegraph or other code, are reconstituted by the pressure actuated signal element regenerating means.

Known pneumatic punched tape readers as above described have a number of important practical defects. In order that the punched tape may be drawn satisfactorily between the two rows of mouths there must not be too much friction between the tape and the surfaces in which the mouths are situated. Commonly one of these surfaces is spring biased towards the other with the tape sandwiched between them. Adjustment of this spring pressure is undesirably critical. If the spring pressure is too high, the friction on the tape will be too high. This friction always tends, in practice, to be undesirably high because both faces of the tape have to slide over the surfaces in which the mouths are. If, on the other hand, the spring pressure is set too light with the object of reducing tape friction, the air on the high pressure side of the tape tends to blow the tape away from the mouths on the said high pressure side and sharply defined opening and cutting off of the air paths by the tape is not obtained. Moreover there is the important defect that, because the pressure actuated signal element regenerating means are actuated by air which has passed through the tape holes and along the air channels on the low pressure side of the tape, there will be a tendency for dirt or matter to collect in those channels and this will adversely affect operation. The present invention seeks to overcome the foregoing defects.

According to this invention a pneumatic punched tape reader comprises a plurality of channels leading air or other gas under pressure to a row of mouths in a fixed surface, means for drawing a punched tape across said surface and the row of mouths therein, an exhaust member arranged to press a punched tape against said surface and said row of mouths, said exhaust member having holes arranged to exhaust to atmosphere gas which has passed through any of said mouths and said tape, and signal element regenerating means adapted and arranged to be actuated by changes in gas pressure in said channels.

The principal feature of the invention lies in the use of the tape to control air exhausting to atmosphere and the arrangement of the signal element regenerating means for actuation by gas pressure changes in the channels on the high pressure side of the tape. By this feature sharp actuation of the signal element regenerating means by the holes in the tape is ensured. Adverse operation due to dirt or matter collecting channels supplied with gas through the punched holes in the tape can no longer occur since are no such channels—only what are in effect exhaust ports direct to atmosphere.

Preferably the exhaust member is a perforated roller spring biassed towards and rolling in contact with the tape. With this preferred arrangement tape friction is reduced since there is sliding friction only between one side of the tape and the surface in which the mouths are.

Preferably also the perforated roller is provided with radially projecting sprocket teeth to engage sprocket holes in the tape and is motor driven to drive the tape.

The invention is illustrated in the accompanying drawing which shows to the extent necessary to an understanding of the invention one embodiment thereof in diagrammatic perspective.

Referring to the drawing, 1 is a hollow metal block member containing a gallery 2 to which air under pressure is supplied as indicated by the arrow A, by means not shown. The gallery supplies air to a number of channels 3 each of which leads to a mouth 4 in an arcuate surface 5 formed on the top of the block 1. A tape driving and exhaust roller 6 whose cylindrical surface conforms with that of the surface 5 is spring biassed (by spring means not shown) towards the surface 5 and is rotated by a driving motor 7. A punched paper tape T is inserted between the driving roller and the surface 5 and is driven as indicated by the arrow D by sprocket teeth 8 provided on the roller and engaging a line of perforations 9 in the tape. The surface 5 has a groove (which does not appear in the figure) to pass the teeth 8. The tape is punched with holes 10 in correspondence with a signal code in the usual way. The mouths 4 are arranged in a row extending parallel to the roller axis. The roller has perforations 11 in lines extending parallel to the roller axis, the said perforations and lines being so arranged that any punched hole coming directly over one of the mouths 4 will open a direct path to atmosphere for air from said mouth unless tape intervenes. Portions in the tape where punched holes occur or might occur are indicated by crosses. The roller has a perforation wherever a cross is shown thereon, though, for simplicity in drawing, not all the perforations are shown.

Each passage 3 has a side branch 12 leading to a signal element regenerating means indicated diagrammatically at 13. As will be appreciated, when compressed air is supplied to the gallery 2, the side branch 12 of any channel 3 will have pressure built up in it so long as the mouth to which that channel 3 leads is blocked off by tape lying across it. When, however, a punched hole in the tape comes opposite that mouth the channel in question is open to atmosphere through the roller 6 and the pressure in that particular branch 12 drops sharply, producing sharp actuation of the associated signal element regenerating means.

It will be seen that, with the embodiment illustrated, tape friction is low because the only sliding motion is between one face of the tape and the surface 5. Moreover the channels 3 are either blocked off or open to atmosphere (depending on the holes in the tape) so that dirt or other matter is extremely unlikely to collect so as to interfere with proper operation—indeed the apparatus is to a large extent self cleaning.

I claim:

1. A pneumatic punched tape reader comprising a plurality of channels leading gas under pressure to a row of mouths in a fixed surface, means for drawing a punched tape across said surface and the row of mouths therein, an exhaust member comprising a perforated roller biassed towards and in rolling contact with the punched tape and pressing the latter against said row of mouths, the perforations in said roller exhausting to atmosphere gas which has passed through any of said mouths and said tape, and signal element regenerating means adapted and arranged to be actuated by changes in gas pressure in said channels.

2. A pneumatic punched tape reader as claimed in claim 1 wherein the perforated roller is provided with radially projecting sprocket teeth to engage sprocket holes in the tape and is motor driven to drive the tape.

References Cited

UNITED STATES PATENTS 2,510,552 6/1950 Carroll et al. ------ 235—61.11

DARYL W. COOK, Primary Examiner